US 11,463,939 B2

(12) United States Patent
Yau et al.

(10) Patent No.: US 11,463,939 B2
(45) Date of Patent: Oct. 4, 2022

(54) METHOD OF IMPLEMENTING 5G CORE ROAMING ROUTING IN AN IPX NETWORK

(71) Applicant: Syniverse Technologies, LLC, Tampa, FL (US)

(72) Inventors: Edward Yau, Tseung Kwan O (HK); Frank Chun, Tseung Kwan O (HK); Ray Lam, Ma Wan (HK)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/682,092

(22) Filed: Feb. 28, 2022

(65) Prior Publication Data

US 2022/0279422 A1 Sep. 1, 2022

Related U.S. Application Data

(60) Provisional application No. 63/154,344, filed on Feb. 26, 2021.

(51) Int. Cl.
| | | |
|---|---|---|
| *H04W 40/24* | (2009.01) | |
| *H04W 8/12* | (2009.01) | |
| *H04W 12/088* | (2021.01) | |
| *H04W 80/06* | (2009.01) | |
| *H04W 84/04* | (2009.01) | |

(52) U.S. Cl.
CPC .......... *H04W 40/248* (2013.01); *H04W 8/12* (2013.01); *H04W 12/088* (2021.01); *H04W 80/06* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 10,568,061 B1 | 2/2020 | Park et al. | |
| 10,834,571 B1 * | 11/2020 | Yau | ........................ H04W 12/06 |

(Continued)

OTHER PUBLICATIONS

TS28.533 "3rd Generation Partnership Project; Technical Specification Group and System Aspects; Management and orchestration; Architecture framework" Oct. 2018. pp. 1-25.

(Continued)

*Primary Examiner* — Brian S Roberts
(74) *Attorney, Agent, or Firm* — Andriy Lytvyn; Smith & Hopen, P.A.

(57) ABSTRACT

A system and method for implementing Transport Layer Security (TLS) Routing Agent in an Internet Protocol Exchange (IPX) network for 5G core roaming. Transmission Control Protocol (TCP) connections are established between the TLS Routing Agent and consumer Security Edge Protection Proxy (cSEPP) and producer Security Edge Protection Proxy (pSEPP). TLS Routing Agent receives HTTP/2 CONNECT request from cSEPP. The TLS Routing Agent routes subsequent TLS handshake and HTTP/2 application messages to producer-SEPP transparently, so that the end-to-end TLS security is maintained. The TLS Routing Agent enables message firewall to protect mobile operator's SEPP. The TLS Routing Agent applies policy routing to route HTTP/2 message intelligently across the IPX network and improves TCP performance by dividing the long Round-Trip-Time between TCP end points into shorter segments.

20 Claims, 7 Drawing Sheets

(56) References Cited

U.S. PATENT DOCUMENTS

| | | | |
|---|---|---|---|
| 11,076,281 B1* | 7/2021 | Yau | H04W 8/12 |
| 2019/0044932 A1* | 2/2019 | Kumar | H04L 63/08 |
| 2020/0178112 A1 | 6/2020 | Youn et al. | |
| 2022/0022040 A1* | 1/2022 | Mahalank | H04W 12/08 |
| 2022/0158847 A1* | 5/2022 | Aggarwal | H04L 9/3247 |

OTHER PUBLICATIONS

TS28.532 3rd Generation Partnership Project;5G; Management and orchestration; Generic management services (3GPP TS 28.532 version 15.0.1 Release 15), Oct. 2018, pp. 1-141.

TS28.531 3rd Generation Partnership Project;5G; Management and orchestration; Provisioning (3GPP TS 28.531 version 15.0.0 Release 15), Oct. 2018, pp. 1-63.

TS28.530 3rd Generation Partnership Project; 5G; Management and orchestration; Concepts, use cases and requirements (3GPP TS 28.530 version 15.0.0 Release 15), Oct. 2018, pp. 1-32.

TS23.502 3rd Generation Partnership Project; 5G; Procedures for the 5G System (3GPP TS 23.502 version 15.2.0 Release 15) Jun. 2018, pp. 1-311.

TS23.501 3rd Generation Partnership Project; 5G; System Architecture for the 5G System (3GPP TS 23.501 version 15.2.0 Release 15) Jun. 2018, pp. 1-219.

* cited by examiner

METHOD OF IMPLEMENTING 5G CORE ROAMING ROUTING IN AN IPX NETWORK

PRIORITY CLAIM

This non-provisional patent application is a continuation of and claims priority to the U.S. Provisional Patent Application No. 63/154,344 filed on Feb. 26, 2021.

BACKGROUND OF THE INVENTION

1. Field of the Invention

This invention relates generally to the field of Internet Protocol (IP) and telecommunications networks, specifically to the 5G core roaming in Internetwork Packet Exchange (IPX). More specifically, the invention relates to methods and systems for routing mobile signaling traffic in IPX networks for 5G core roaming.

2. Brief Description of the Related Art

Mobile roaming refers to the scenario where a mobile subscriber of a Home Public Land Mobile Network (HPLMN) operator is using mobile service in a foreign location serviced by a Visited Public Land Mobile Network (VPLMN).

5G system architecture is specified in 3GPP TS23.501 "3rd Generation Partnership Project; Technical Specification Group Services and System Aspects; System Architecture for the 5G System; Stage 2" and TS23.502 "3rd Generation Partnership Project; Technical Specification Group Services and System Aspects; Procedures for the 5G System; Stage 2." 5G Signaling messages between roaming operators are specified in 3GPP TS29.573 "3rd Generation Partnership Project; Technical Specification Group Core Network and Terminals; 5G System; Public Land Mobile Network (PLMN) Interconnection; Stage 3." 5G security design is specified in 3GPP TS33.501 "3rd Generation Partnership Project; Technical Specification Group Services and System Aspects; Security architecture and procedures for 5G system."

To provide roaming services to a User Equipment (UE) 12, Network Functions (NFs) in the Home Public Land Mobile Network (HPLMN) 14 and the Visited Public Land Mobile Network (VPLMN) 16 need to communicate with each other through an Internet Protocol Exchange (IPX) network. Such communication is required to enable UE 12 subscribed to HPLMN 14 to use 5G service in VPLMN 16.

FIG. 1 depicts a service-based representation of Home Routed (HR) roaming architecture, while FIG. 2 depicts a service-based representation of a Local Breakout (LBO) roaming architecture. The HR and LBO roaming architectures differ in handling of user payload. In HR architecture, user payload is routed to HPLMN 14 to reach the internet, while in LBO architecture user payload directly breaks-out at VPLMN 16 to the Internet. As depicted in FIGS. 1 and 2, in both the HR and LBO roaming architectures, network functions of HPLMN 14 and VPLMN 16 communicate with one another for multiple purposes, including authentication, authorization, accounting, registration, session management, policing, user payload transmissions, etc. Examples of such network functions are Network Repository Function (NRF) 18, Authentication Server Function (AUSF) 20, Unified Data Management (UDM) 22, Access and Mobility Management Function (AMF) 24, Session Management Function (SMF) 26, Policy Control Function (PCF) 28, Network Slice Selection Function (NSSF) 30 and User Plane Function (UPF) 32. Signaling messages in 5G is based on HTTP/2 protocol specified in IETF RFC7540.

Continuing reference to FIGS. 1 and 2, in 5G core roaming, as specified in 3GPP TS29.573, all signaling messages between network functions in VPLMN 16 and HPLMN 14 are carried over N32 interface between a VPLMN Security Edge Protection Proxy (vSEPP) 34 and HPLMN SEPP (hSEPP) 36. A key aspect of vSEPP 34 and hSEPP 36 is that they function as 'application-firewall' to provide the necessary security measures for communicating with roaming partners, such as topology hiding, message authenticity, integrity and confidentiality checking, encryption of information elements, etc.

N32 interface between vSEPP 34 and hSEPP 36 consists of two parts (1) N32-c for control plane and (2) N32-f for forward plane. The N32-c control plane is used for the following functions: (1) security capabilities negotiation, (2) parameters exchange, (3) n32-f termination, and (4) n32-f error reporting. The N32-f plane carries the actual application messages between network functions. The present disclosure pertains to both N32-c and N32-f messages.

According to 3GPP TS33.501 and TS29.573, all HTTP/2 request and response messages in the N32-f interface are protected with either the 'PRINS' model (PRotocol for N32 INterconnect Security) or Transport Layer Security (TLS) model. The present disclosure pertains to the TLS model which is schematically depicted in FIG. 3. (Note: rather than referencing vSEPP 34 and hSEPP 36, subsequent description and drawings reference consumer-SEPP (cSEPP) 42 and producer-SEPP (pSEPP) 44. The cSEPP 42 is the request originator, while pSEPP 44 is the destination server. If a request originates from VPLMN 16, then vSEPP 34 becomes cSEPP 42, while hSEPP 36 becomes pSEPP 44. On the other hand, if a request originates from HPLMN 14, then hSEPP 36 becomes cSEPP 42, while vSEPP 34 becomes pSEPP 44.)

Continuing reference to FIG. 3, according to the TLS model, TLS session is established directly between cSEPP 42 and pSEPP 44, which are connected to IPX providers. The IPX provider to which cSEPP 42 is connected is referred to as a consumer-IPX (cIPX) 46, while the IPX provider to which pSEPP 44 is connected is referred to as producer-IPX (pIPX) 48. The TLS session provides an end-to-end security between cSEPP 42 and pSEPP 44, such that IPX has no visibility with respect to the content of the messages exchanged therebetween, and the original message content remains unchanged.

Traditional 3G and 4G roaming signaling messages are routed in IPX via SS7 Signal Point Code (STP) in 2G/3G, or Diameter Routing Agent (DRA) in 4G roaming. 3G STP examines the SCCP (Signaling Connection Control Part) Called-Party-Address and 4G DRA examines the Diameter Destination-Realm of incoming messages to determine the 'next-hop' routing, which can be a directly-connected PLMN, or via a third-party IPX (known as 'IPX peering'). Because of the end-to-end encryption of TLS traffic in N32-c and N32-f, TLS sessions are meant to be directly established between cSEPP 42 and pSEPP 44. Usually, cSEPP 42 will establish a Transmission Control Protocol (TCP) connection directly with pSEPP 44, perform the TLS handshake, and send HTTP/2 signaling messages via the TLS tunnel over the TCP connection. IPX no longer has a 'signaling' agent to perform traffic routing.

TLS sessions run over TCP connections. In a roaming situation, cSEPP 42 and pSEPP 44 may be geographically separated by a long distance—for example, HPLMN 14 may be located in North America while VPLMN 16 mar be located in South Africa. TCP was originally developed for local area network communications and its performance degrades as the Round-Trip-Time (RTT) increases. Performance degradation occurs for multiple reasons including the following: 1) the 'slow-start' mechanism, 2) congestion window that increases with retransmissions and 3) being streaming protocol that requires reliable transmission of every packet. To improve the overall performance of TCP, intermediate proxies can be deployed along the path, dividing a long 'end-to-end' connection into multiple short 'hop-by-hop' connections. This can be realized by putting HTTP Proxies for HTTP (without TLS) communications, and HTTPS Man-In-The-Middle (MITM) Proxies for HTTPS (HTTP over TLS) communications. However, HTTPS MITM proxies require that certificates must be installed in the proxies and, therefore, violate the end-to-end security model of TLS.

Accordingly, what is needed is a method for implementing a TLS Routing Agent in IPX for routing HTTP/2-based N32 traffic between cSEPP 42 and pSEPP 44 in 5G mobile operator networks. This need exists for both the HR roaming architecture, depicted in FIG. 1, and the LBO roaming architecture, depicted in FIG. 2.

SUMMARY OF THE INVENTION

This invention pertains to methods and systems for implementing a Transport Layer Security (TLS) Routing Agent in an Internetwork Packet Exchange (IPX) network for 5G core roaming, while complying to the 5G security requirements. This invention pertains to the TLS model being used in the N32-f interface between HPLMN SEPP (hSEPP) and VPLMN SEPP (vSEPP). This invention applies to both home-routed (HR) roaming architecture, depicted in FIG. 1, and local breakout (LBO) roaming architecture, depicted in FIG. 2.

According to an embodiment of the invention, consumer-SEPP (cSEPP) (request originator) would be configured to send HTTP/2 traffic to a 'forward proxy' using the HTTP/2 'CONNECT' method specified in RFC7540. The TLS Routing Agent functions as a HTTP/2 forward proxy that supports the CONNECT method and routes the HTTP/2 requests to the destination server (pSEPP) directly or via another TLS Routing Agent. The TLS Routing Agent may also have message firewall capabilities for traffic filtering and a policy routing engine to determine an optimal routing path.

According to an embodiment of the invention, a TLS Routing Agent may comprise the following components: 1) HTTP/2 protocol stack, 2) HTTP/2 server implementation, 3) HTTP/2 client implementation, 4) a dynamic TLS connection map, 5) a message firewall configuration, 6) a policy routing engine, and 7) OA&M modules supporting Northbound interface for provisioning, logging, alarms, Key Performance Indicator (KPI) monitoring, etc.

An embodiment of the invention pertains to a method of enabling a Visiting Public Land Mobile Network (VPLMN) to provide a 5G roaming service to a User Equipment (UE) subscribed to a Home Public Land Mobile Network (HPLMN) via an IPX network. A TLS Routing Agent hosted on the IPX network, the TLS Routing Agent configured to communicate with a cSEPP of the VPLMN and a pSEPP of the HPLMN. The method begins with cSEPP initiating a Transmission Control Protocol (TCP) handshake toward the TLS Routing Agent. The TLS Routing Agent and the cSEPP perform a three-way handshake to establish a TCP connection with one another.

Subsequent to the first TCP handshake between the TLS Routing Agent and the cSEPP, the cSEPP is configured to send a Hypertext Transport Protocol Proxy (HTTP)/2 CONNECT request to the TLS Routing Agent. The TLS Routing Agent is configured to identify the pSEPP based on a pseudo-header of the HTTP/2 CONNECT request message. Next, the TLS Routing Agent initiates a three-way TCP handshake toward the identified pSEPP (either directly or via one or more intermediate TLS Routing Agents) to establish a TCP connection therewith. In a scenario involving intermediate TLS Routing Agents, a TCP connection is established between each pair of peer TLS Routing Agents.

After establishing a first TCP connection between the cSEPP and the TLS Routing Agent and a second TCP connection between the TLS Routing Agent and the pSEPP, the TLS Routing Agent receives a TLS handshake message ('Client Hello') from the cSEPP via the first TCP connection therebetween. The TLS Routing Agent then sends this message to the pSEPP. The pSEPP responds with a TLS handshake response message ('Server Hello and Certificate'), which the TLS Routing Agent sends to the cSEPP. Upon receipt of the response to the TLS handshake message by the cSEPP, a TLS tunnel is established between the cSEPP and the pSEPP via the TLS Routing Agent, such that N32-c TLS session and a N32-f TLS session are established between the cSEPP and the pSEPP via the TLS Routing Agent Once the TLS tunnel is established, the cSEPP and pSEPP can exchange request and response application messages with one another via the TLS tunnel. The TLS Routing Agent has no visibility into contents of messages exchanged between the cSEPP and the pSEPP, thereby providing the end-to-end security therebetween. In this manner, the TLS Routing Agent enables communication between the cSEPP and the pSEPP with end-to-end security, thereby enabling the VPLMN to provide the 5G roaming service to the UE.

In an embodiment, the TLS Routing Agent comprises a HTTP/2 Proxy, which is configured to communicate with the cSEPP and the pSEPP. The request application message and the response application message exchanged between the cSEPP and the pSEPP can be HTTP/2 messages.

In an embodiment, prior to initiating the TCP handshake with the pSEPP, the TLS Routing Agent is configured to verify that the HTTP/2 CONNECT request received from the cSEPP is permitted to be routed to the pSEPP. Upon successful verification, the TLS Routing Agent is configured to determine a routing path between the cSEPP and the pSEPP.

Deploying TLS Routing Agent in an IPX network offers the following benefits to Mobile Network Operators (MNOs) and IPX service providers without impacting the end-to-end security model in TLS: 1) improved TCP performance over long distance communications between cSEPP and pSEPP; 2) the TLS Routing Agent can function as a message firewall to guard pSEPP against HTTP/2 traffic not originated from permitted roaming partners; 3) simplified MNO's network firewall configuration such that it only needs to accept incoming TCP connections from IPX TLS Routing Agent, instead of from all roaming partners' SEPPs; 4) IPX-peering for MNOs that are not directly connected to an IPX provider, wherein the TLS Routing Agent may further support intelligence policy routing to best-route N32 traffic by accounting for the bandwidth, cost, latency, Quality of Service (QoS) and reliability of each links; and 5) by examining packet flows through the TLS Routing Agent, IPX providers have visibility into the amount of traffic flowing through the TLS Routing Agent, which is a useful source of information for traffic reporting, billing, and business intelligence purposes.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and changes may be made without departing from the scope of the invention.

Figure 1:
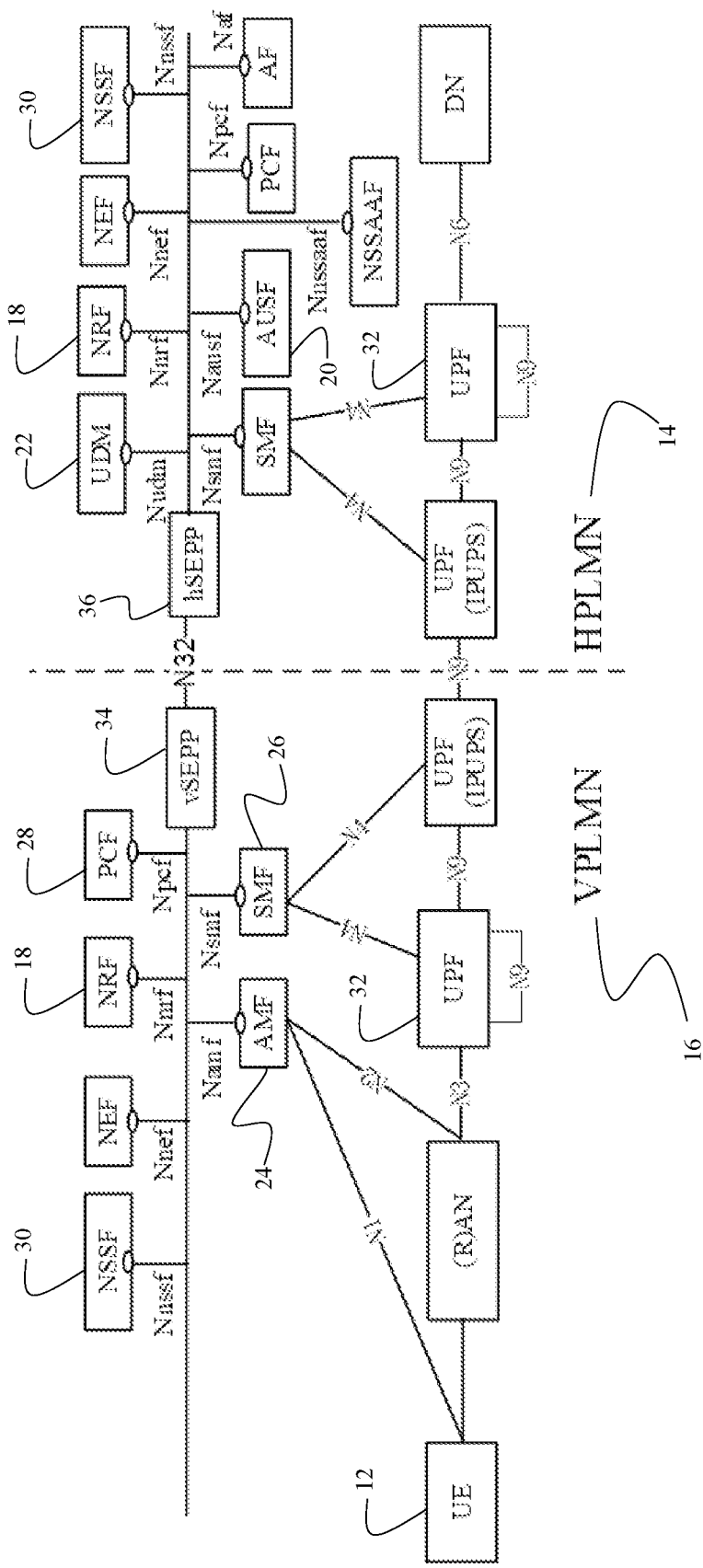
FIG. 1 is a block diagram schematically depicting the 5G roaming architecture in a home-routed scenario in service-based representation. Supported service names at network functions are shown.
Figure 2:
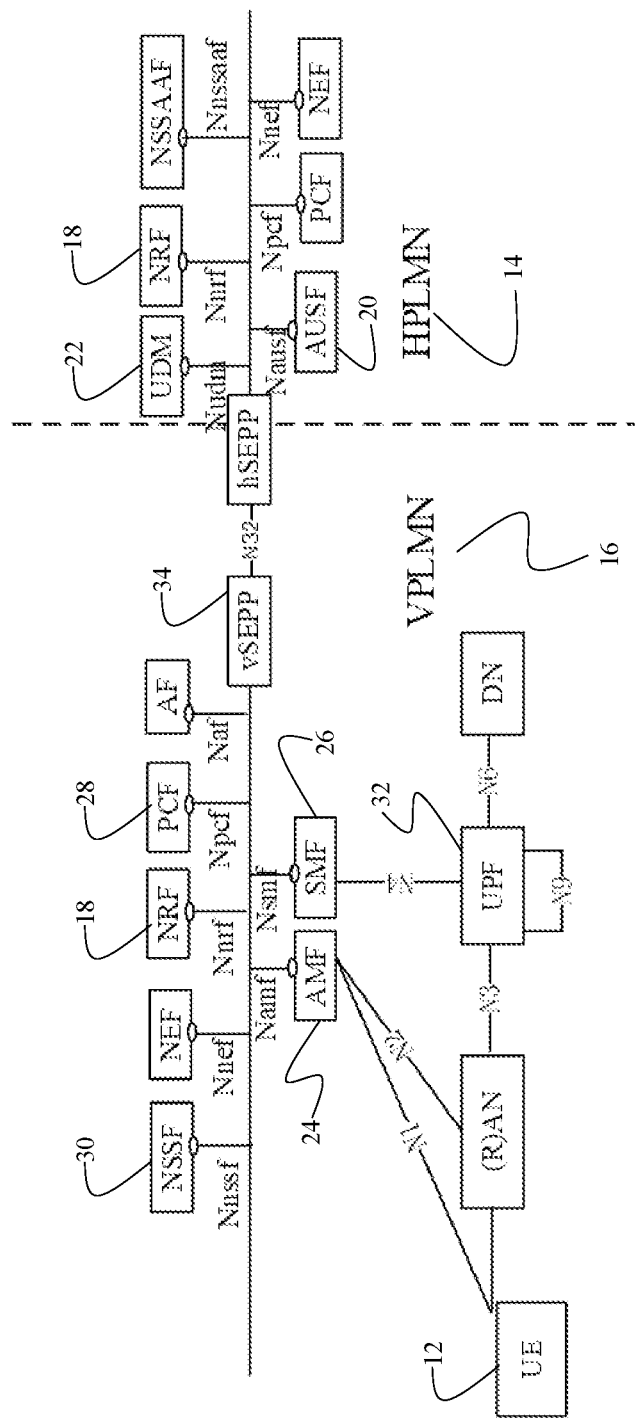
FIG. 2 is a block diagram schematically depicting the 5G roaming architecture in a local-breakout scenario in service-based representation. Supported service names at network functions are shown.
Figure 3:
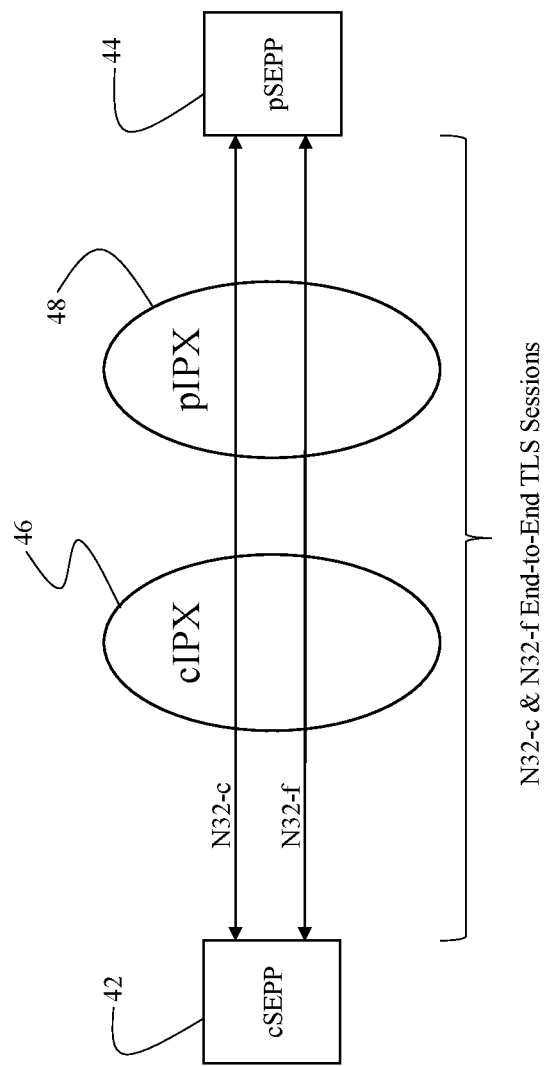
FIG. 3 is a block diagram schematically depicting communications over the N32 interface between the consumer-SEPP (cSEPP) and producer-SEPP (pSEPP) under the TLS model (ref 3GPP TS33.501 and TS29.573). The N32 interface comprises of N32-c (the control plane) and N32-f (the forward plane), wherein both N32-c and N32-f TLS sessions are established directly between the cSEPP and the pSEPP. Note: the cSEPP can be the visited network and the pSEPP be the home network, or the cSEPP can be the home network and pSEPP be the visited network.
Figure 4:
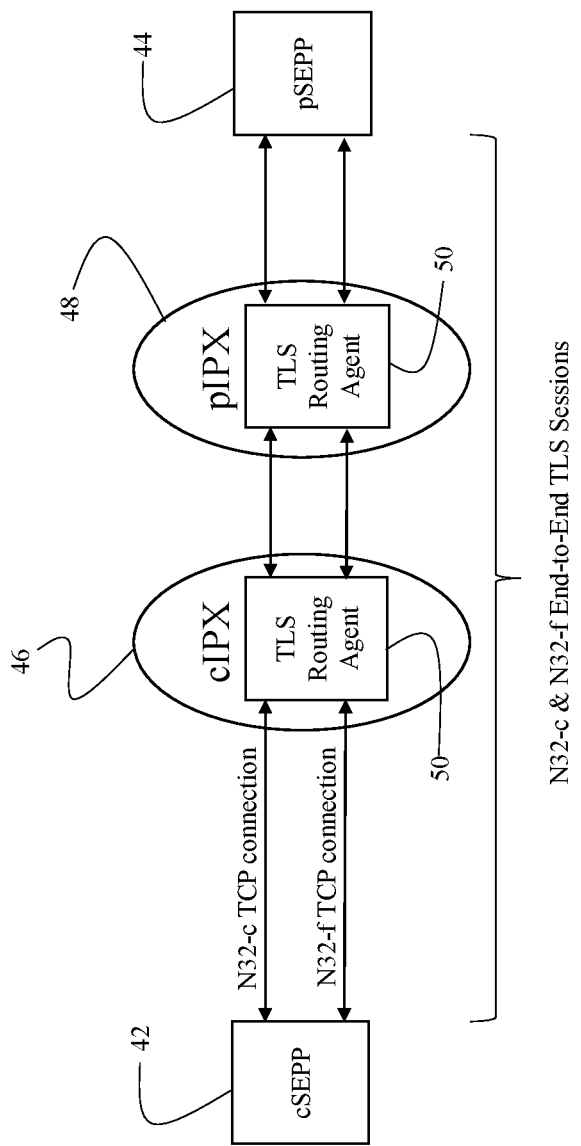
FIG. 4 is a block diagram schematically depicting the N32 interface communications between the consumer-SEPP (cSEPP) and producer-SEPP (pSEPP) using the TLS model with TLS Routing Agent. Both N32-c and N32-f TLS sessions are end-to-end between the cSEPP and pSEPP. However, TCP connections are hop-by-hop at each TLS Routing Agent.
Figure 7:
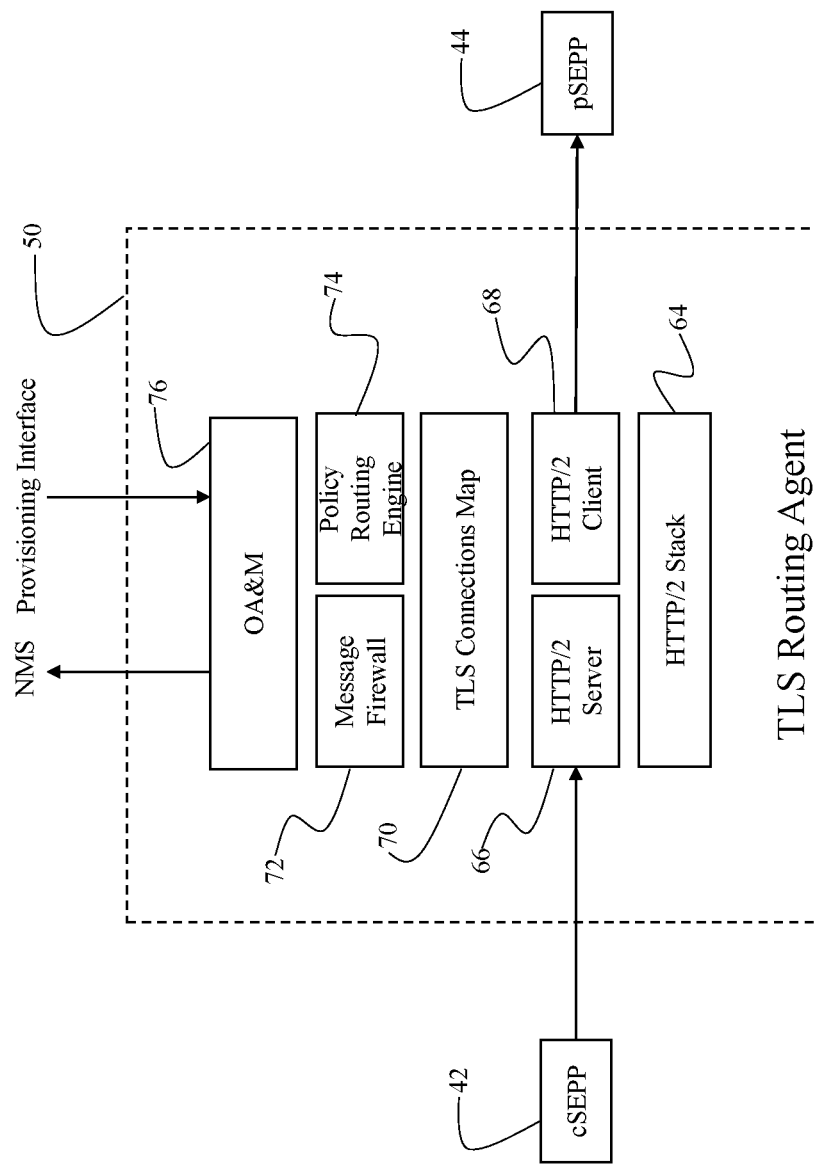
FIG. 7 is a block diagram schematically depicting the software component architecture of a TLS Routing Agent.

In the embodiment of the invention depicted in FIG. 4, consumer-SEPP (cSEPP) 42 connects to consumer-IPX (cIPX) 46, while pSEPP 44 connects to producer-IPX (pIPX) 48. FIG. 4 depicts that TLS Routing Agents 50 are deployed in both cIPX 46 and pIPX 48, as well as in any intermediate IPX (between cIPX 46 and pIPX 48), if applicable. The term "TLS Routing Agent" refers to a software application configured to be executed by a computer processor, a special-purpose hardware programmed with software and/or firmware, or a combination of special-purpose and programmable circuitry. Hence, embodiments may include a machine-readable medium having stored thereon instructions which may be used to program a computer (or other electronic devices) to perform a process. Software component architecture of TLS Routing Agent 50 is schematically depicted in FIG. 7 and disclosed in more detail below.

FIG. 4 depicts that, N32-c and N32-f Transmission Control Protocol (TCP) connections are established in a hop-by-hop model between (1) cSEPP 42 and TLS Routing Agent 50 hosted on cIPX 46; (2) between TLS Routing Agents 50 hosted on cIPX 46 and pIPX 48; and (3) between TLS Routing Agent 50 hosted on pIPX 48 and pSEPP 44. By deploying intermediate TLS Routing Agent nodes 50 in geographical locations between cSEPP 42 and pSEPP 44, long-distance TCP connections (between cSEPP and pSEPP) are replaced by shorter-distance connections between TLS Routing Agent nodes 50, therefore, improving the TCP performance.

TLS Routing Agent nodes 50 enable TLS sessions to be established end-to-end between cSEPP 42 and pSEPP 44, with TLS Routing Agent nodes 50 only acting as routing agents for TLS handshake messages and HTTP/2 application messages. Thus, TLS Routing Agent nodes 50 and have no visibility into the message contents. Accordingly, end-to-end TLS security between cSEPP 42 and pSEPP 44 is maintained.

Figure 5:
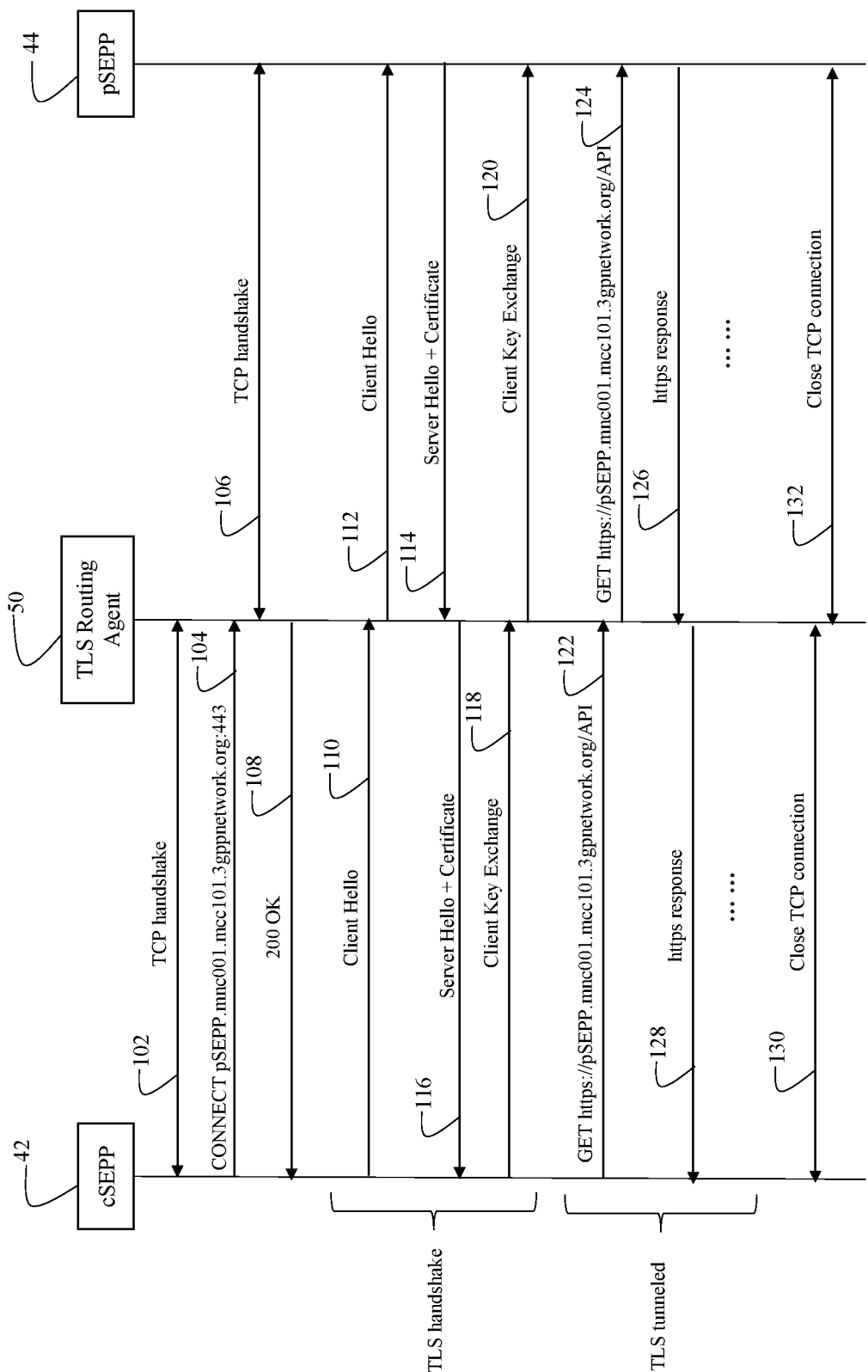
FIG. 5 is a sequence diagram schematically depicting the callflow of TLS session establishment, HTTP/2 request and response message pairs, and TCP disconnection of N32 communications between cSEPP and pSEPP traversing a TLS Routing Agent.

FIG. 5 depicts a signaling flow diagram for enabling communication between cSEPP 42 and pSEPP 44 via one or more TLS Routing Agents 50. Although FIG. 5 and the description provided below may reference a single TLS Routing Agent 50, a person of ordinary skill in the art will appreciate that the method may include intermediate TLS Routing Agent nodes 50, as explained in the preceding paragraph and depicted in FIG. 6, discussed below.

FIG. 5 depicts that the method of connecting cSEPP 42 and pSEPP 44 begins with step 102, in which cSEPP 42 and TLS Routing Agent 50 hosted on the IPX perform a TCP handshake, thereby establishing a TCP connection therebetween. Next, in step 104, cSEPP 42 sends a HTTP/2 CONNECT message to TLS Routing Agent 50. Upon receiving the CONNECT request, TLS Routing Agent 50 executes the following steps: 1) examines the target server as in ":authority" pseudo-header, 2) performs message filtering by checking whether the HTTP/2 message can be routed from the originator to the target server, 3) checks the routing policy and determines the best routing path. Upon successful completion of these steps, the method proceeds to step 106, in which TLS Routing Agent 50 performs a TCP handshake with pSEPP 44 (either directly or indirectly via next-hop intermediate TLS Routing Agent 50), thereby establishing a TCP connection therebetween. Then, upon successful TCP connection to the target server (or next-hop TLS Routing Agent 50), TLS Routing Agent 50 sends a '200 OK' message to cSEPP 42. At this point, TCP connections are established between cSEPP 42 and TLS Routing Agent 50 and between TLS Routing Agent 50 and pSEPP 44 (either directly or via intermediate TLS Routing Agent nodes 50).

Next, after receiving the '200 OK' response to the CONNECT procedure, cSEPP 42 establishes a TLS session with the target server (pSEPP 44) via TLS Routing Agent 50. In step 110, cSEPP 42 sends a 'Client Hello' TLS handshake message to TLS Routing Agent 50. In step 112, TLS Routing Agent 50 transparently passes the 'Client Hello' TLS handshake message to pSEPP 44. In step 114, pSEPP 44 sends a 'Server Hello and Certificate' TLS handshake message to TLS Routing Agent 50. In step 118, cSEPP sends a 'Client Key Exchange' TLS handshake message to TLS Routing Agent 50. In step 120, TLS Routing Agent 50 sends this message to pSEPP 44. At this point, the TLS handshake between cSEPP 42 and pSEPP 44 has been completed and a TLS tunnel is established therebetween.

Next, upon completion of the TLS handshake, in step 122, cSEPP 42 sends a HTTP/2 request body message to pSEPP 44 via the TLS tunnel, which traverses TLS Routing Agent 50 (and any intermediate TLS Routing Agent nodes 50). In step 124, TLS Routing Agent 50 sends the HTTP/2 request body message to pSEPP 44. In step 126, pSEPP 44 sends a HTTP/2 response application message via the TLS tunnel. TLS Routing Agent 50 receives this message and, in step 128, sends it to cSEPP 42. In this manner, end-to-end security between cSEPP 42 and pSEPP 44 is maintained because the entire TLS handshake is between cSEPP 42 and pSEPP 44. Upon completion of communication between cSEPP 42 and pSEPP 44, cSEPP 42 and TLS Routing Agent 50 is configured to close the TCP connection therebetween in step 130. In step 132, TLS Routing Agent 50 and pSEPP 44 also close their TCP connection.

Figure 6:
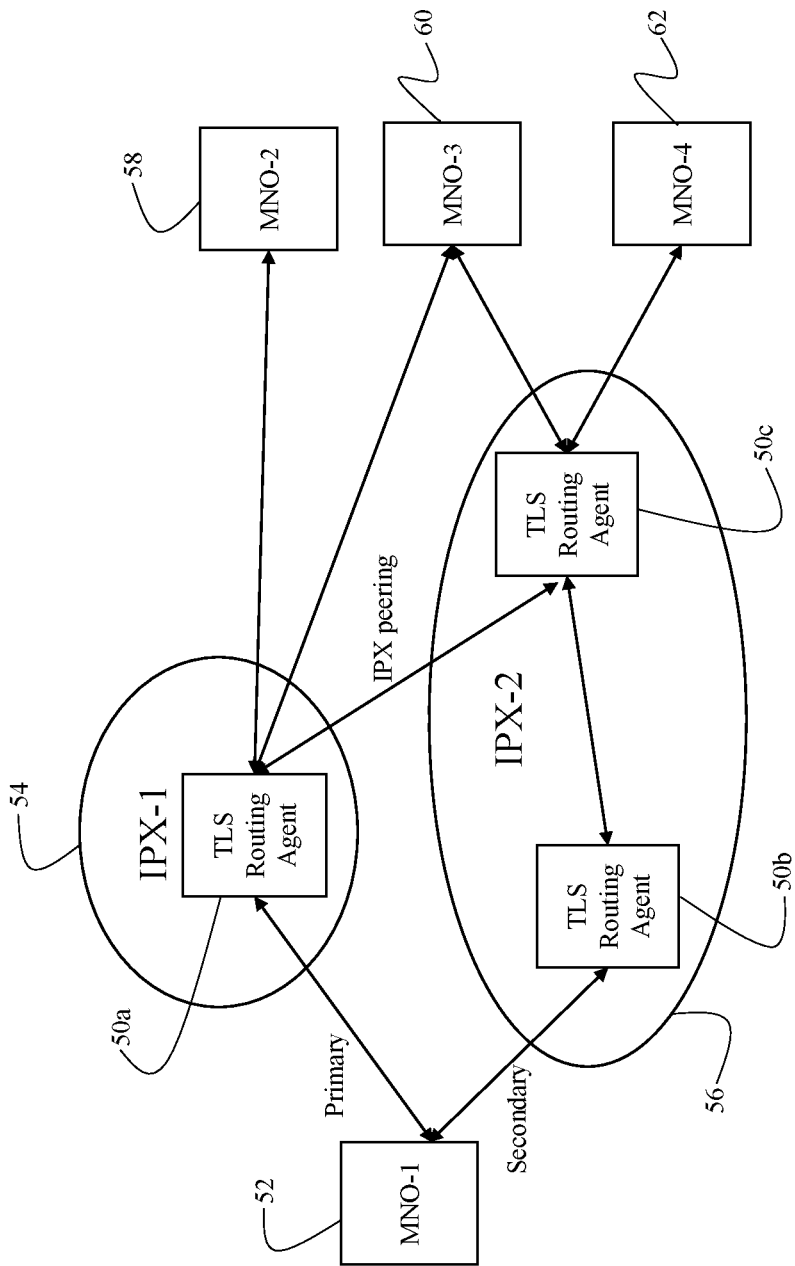
FIG. 6 is a block diagram schematically depicting the inter-PLMN connectivity of MNOs via one or more IPX providers.

FIG. 6 schematically depicts an exemplary architecture for interconnecting multiple Mobile Network Operators (MNOs) via multiple IPX networks. A first MNO 52 is connected to a first IPX network 54 via a primary route and connected a second IPX network 56 via a secondary route. First IPX network 54 has direct connections with first MNO 52, second MNO 58, and third MNO 62, while second IPX network 56 has direct connections with third MNO 60 and fourth MNO 62. Thus, if first IPX network 54 needs to route traffic from first MNO 52 to fourth MNO 62, it can accomplish this objective by routing through second IPX network 56, via a peering link between TLS Routing Agent 50*a* and TLS Routing Agent 50*c*. Similarly, if second IPX 56 needs to route traffic from first MNO 52 to second MNO 58, it can accomplish this by routing through first IPX network 54 via a peering link between TLS Routing Agent 50*c* and TLS Routing Agent 50*a*.

FIG. 7 is a block diagram schematically depicting exemplary software component architecture of TLS Routing Agent 50. According to this embodiment, TLS Routing Agent 50 comprises the following components: (1) HTTP/2 protocol stack 64, (2) HTTP/2 server implementation 66, (3) HTTP/2 client implementation 68, (4) a dynamic TLS Connection Map 70, (5) a message firewall configuration 72, (6) a policy routing engine 74, and (7) OA&M modules 76 supporting Northbound interface for provisioning, logging, alarm, Key Performance Indicator (KPI) monitoring, etc.

The HTTP/2 protocol stack 64 is an implementation of HTTP/2 protocol according to RFC7540. This implementation supports the CONNECT Method for proxying TLS connections. HTTP/2 Client 68 and HTTP/2 Server 66 are client and server implementations of HTTP/2 connections. The TLS Connection Map 70 stores a list of TLS connections, each list consisting of the information of TCP connection towards cSEPP 42 and the corresponding TCP connection towards pSEPP 44. This map can be used to route the TLS and HTTP/2 application messages between HTTP/2 server 66 and HTTP/2 client 68 connections.

Message Firewall 72 can be used to protect pSEPP 44 from unwanted inbound HTTP/2 connections. It contains a whitelist of cSEPPs 42 permitted to connect to pSEPP 44. Any HTTP/2 CONNECT attempts with origination and destination nodes not included in the whitelist are denied.

Policy Routing Engine 74 is used to determine the best route for a particular pair of cSEPP 42 and pSEPP 44. Some MNOs are not directly connected to IPX, and, therefore, traffic may need to be routed via a third-party IPX network (known as IPX-peering). Policy Routing Engine 74 determines the best route based on multiple factors, such as bandwidth, cost, latency, reliability and QoS of each link.

OA&M module 76 supports Northbound interface for connection to IPX's Operation and Supporting System (OSS). It is used for configuration provisioning, logging, alarms and Key Performance Indicator (KPI) monitoring, etc.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of enabling a Visiting Public Land Mobile Network (VPLMN) to provide a 5G roaming service to a User Equipment (UE) subscribed to a Home Public Land Mobile Network (HPLMN) via an Internet Protocol Exchange (IPX) network, the method comprising:
   providing a Transport Layer Security (TLS) Routing Agent hosted on the IPX network, the TLS Routing Agent configured to communicate with a consumer Security Edge Protection Proxy (cSEPP) of the VPLMN and a producer Security Edge Protection Proxy (pSEPP) of the HPLMN;
   performing a first Transmission Control Protocol (TCP) handshake between the TLS Routing Agent and the cSEPP to establish a first TCP connection between the cSEPP and the TLS Routing Agent;
   performing a second TCP handshake between the TLS Routing Agent and the pSEPP to establish a second TCP connection between the TLS Routing Agent and the pSEPP,
   receiving, by the TLS Routing Agent via the first TCP connection, a TLS handshake message from the cSEPP, and sending the TLS handshake message to the pSEPP via the second TCP connection;
   receiving, by the TLS Routing Agent via the second TCP connection, a response to the TLS handshake message from the pSEPP, and sending the response to the TLS handshake message to the cSEPP via the first TCP connection;
   upon receipt of the response to the TLS handshake message by the cSEPP, establishing a TLS tunnel between the cSEPP and the pSEPP via the TLS Routing Agent;
   receiving a request application message by the TLS Routing Agent from the cSEPP over the TLS tunnel, and sending the request application message to the pSEPP over the TLS tunnel;
   receiving a response application message by the TLS Routing Agent from the pSEPP over the TLS tunnel, and sending the response application message to the cSEPP over the TLS tunnel, thereby enabling communication between the cSEPP and the pSEPP with end-to-end security, enabling the VPLMN to provide the 5G roaming service to the UE.

2. The method of claim 1, wherein the TLS Routing Agent comprises a Hypertext Transport Protocol Proxy (HTTP)/2 Proxy.

3. The method of claim 2, wherein the HTTP/2 Proxy is in communication with the cSEPP and the pSEPP.

4. The method of claim 1, wherein the request application message and the response application message are Hypertext Transport Protocol Proxy (HTTP)/2 messages.

5. The method of claim 1, wherein subsequent to the first TCP handshake between the TLS Routing Agent and the cSEPP, the cSEPP is configured to send a Hypertext Transport Protocol Proxy (HTTP)/2 CONNECT request to the TLS Routing Agent.

6. The method of claim 5, wherein the TLS Routing Agent is configured to identify the pSEPP based on a pseudo-header of the HTTP/2 CONNECT request.

7. The method of claim 6, wherein prior to the second TCP handshake between the TLS Routing Agent and the pSEPP, the TLS Routing Agent is configured to verify that the HTTP/2 CONNECT request is permitted to be routed to the pSEPP.

8. The method of claim 1, wherein the TLS Routing Agent is configured to determine a routing path between the cSEPP and the pSEPP.

9. The method of claim 1, wherein a N32-c TLS session and a N32-f TLS session are established between the cSEPP and the pSEPP via the TLS Routing Agent.

10. The method of claim 1, wherein the first TCP handshake and/or the second TCP handshake is a three-way handshake.

11. The method of claim 1, wherein the TLS handshake message is a TLS 'Client Hello' message and wherein the response to the TLS handshake message is a TLS 'Server Hello and Certificate' message.

12. The method of claim 1, wherein the second TCP connection is established between the TLS Routing Agent and the pSEPP via one or more intermediate TLS Routing Agents.

13. The method of claim 1, wherein the TLS Routing Agent has no visibility into contents of messages exchanged between the cSEPP and the pSEPP, thereby providing the end-to-end security therebetween.

14. A method of enabling a 5G roaming service, the method comprising:
   providing a first Transport Layer Security (TLS) Routing Agent hosted on a first Internet Protocol Exchange (IPX) network, the first TLS Routing Agent configured to communicate with a consumer Security Edge Protection Proxy (cSEPP) of a first mobile network;
   providing a second TLS Routing Agent hosted on a second IPX network, the second TLS Routing Agent configured to communicate with a producer Security Edge Protection Proxy (pSEPP) of a second mobile network;

establishing a first Transmission Control Protocol (TCP) connection between the first TLS Routing Agent and the cSEPP;

establishing a second TCP connection between the first TLS Routing Agent and the second TLS Routing Agent;

establishing a third TCP connection between the second TLS Routing Agent and the pSEPP;

receiving, via the first TCP connection, a TLS handshake message from the cSEPP;

sending, via the second TCP connection and the third TCP connection, the TLS handshake message to the pSEPP;

receiving, via the third TCP connection, a response to the TLS handshake message from the pSEPP;

sending, via the second TCP connection and the first TCP connection, the response to the TLS handshake message to the cSEPP;

upon receipt of the response to the TLS handshake message by the cSEPP, establishing a TLS tunnel between the cSEPP and the pSEPP via the first TLS Routing Agent and the second TLS Routing Agent, wherein the pSEPP and the cSEPP are configured to communicate with one another via the TLS tunnel;

receiving, by the first TLS Routing Agent, a request application message from the cSEPP over the TLS tunnel, and sending, by the first TLS Routing Agent, the request application message to the pSEPP over the TLS tunnel via the second TLS Routing Agent; and receiving, by the second TLS Routing Agent, a response application message from the pSEPP over the TLS tunnel, and sending, by the second TLS Routing Agent, the response application message to the cSEPP over the TLS tunnel via the first TLS Routing Agent, thereby enabling communication between the cSEPP and the pSEPP with end-to-end security.

15. The method of claim 14, wherein the first TLS Routing Agent comprises a Hypertext Transport Protocol Proxy (HTTP)/2 Proxy.

16. The method of claim 15, wherein the first and the second TLS Routing Agents have no visibility into contents of messages exchanged between the cSEPP and the pSEPP, thereby providing the end-to-end security therebetween.

17. The method of claim 14, wherein the request application message and the response application message are HTTP/2 messages.

18. The method of claim 14, wherein the first TLS Routing Agent or the second TLS Routing Agent is configured to identify the pSEPP based on a pseudo-header of the HTTP/2 CONNECT request sent by the cSEPP.

19. The method of claim 18, wherein prior to establishing the second TCP connection between the second TLS Routing Agent and the pSEPP, the second TLS Routing Agent is configured to verify that the HTTP/2 CONNECT request is permitted to be routed to the pSEPP.

20. The method of claim 14, wherein the second TCP connection between the first TLS Routing Agent and the second TLS Routing Agent is established via one or more intermediate TLS Routing Agents.

* * * * *